F. W. MURPHY.
MATCH BOX.
APPLICATION FILED NOV. 23, 1920.

1,404,136. Patented Jan. 17, 1922.

FRANCIS W. MURPHY.
INVENTOR

John Babis, Jr.
WITNESS:

BY Victor J. Evans
ATTORNEY

UNITED STATES PATENT OFFICE.

FRANCIS W. MURPHY, OF PHILADELPHIA, PENNSYLVANIA.

MATCH BOX.

1,404,136. Specification of Letters Patent. Patented Jan. 17, 1922.

Application filed November 23, 1920. Serial No. 425,983.

*To all whom it may concern:*

Be it known that I, FRANCIS W. MURPHY, a citizen of the United States, residing at Philadelphia, in the county of Philadelphia and State of Pennsylvania, have invented new and useful Improvements in Match Boxes, of which the following is a specification.

This invention relates to match-boxes and it has more particular reference to that type or form of match-box provided with a windshield which when opened out or extended for use permits of the lighting of a cigar, cigarette, pipe or the like without fear of the flame being extinguished by a gust of wind or other inclement surrounding condition.

The main object of my invention is to provide a new or improved match-box of the type above referred to which is simple in construction, cheap to manufacture and effective in use.

Another object of my invention is to provide a holder or case for a standard safety match-box with which is combined a collapsible windshield.

Still further this invention has for an object to provide a container or shield for an ordinary safety match-box open at both ends for easy access to the matches and having hinged thereto a collapsible shield or canopy which when not in use folds down compactly on the container and occupies but little extra space.

With these and other objects in view as will become more apparent as the description proceeds, my invention consists essentially in the novel features of construction, combinations and arrangements of parts hereinafter described and more particularly defined by the appended claims.

In the further disclosure of the invention reference is to be had to the accompanying sheet of explanatory drawings constituting a part of this specification, and in which like characters of reference designate the same or corresponding parts in all the views.

Figure 5 is a detail of one of the collapsible elements hereinafter more particularly referred to.

Referring more particularly to the drawings and to the embodiment of my invention illustrated by Figures 1 to 6 inclusive the numeral 10 designates a thin sheet metal casing of appropriate dimensions to accommodate an ordinary commercial safety match-box (not shown) and it is provided in one or both of the opposed walls 11 with an elongated slot or opening 12 for exposing a portion of the abrading material or the like usually provided on match-boxes on which a match can be scratched to strike a light.

Figure 1:
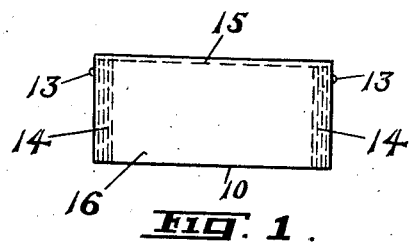
Figure 1 is a front end view of my improved combined match-box and windshield and showing said shield in collapsed or closed down position.
Figure 2:
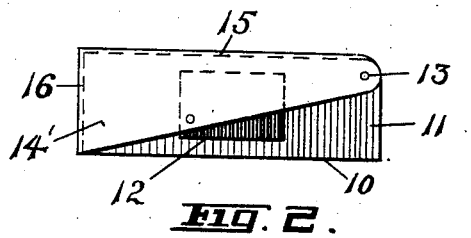
Figure 2 is a side view of the same.
Figure 3:
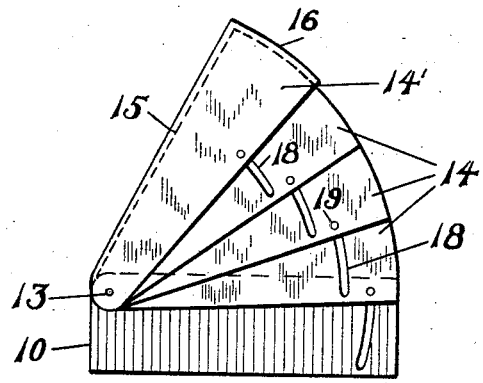
Figure 3 is a side elevation of the match-box with the windshield opened out and ready for use.
Figure 4:
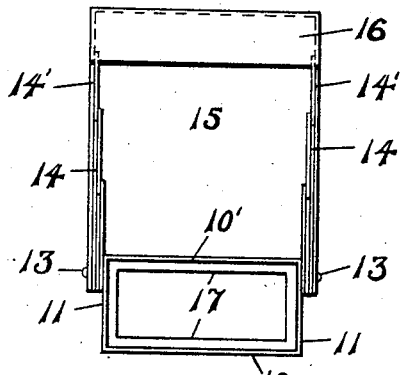
Figure 4 is an end elevation looking towards the left hand of Figure 3.
Figure 5:
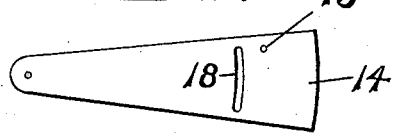
Figure 6:
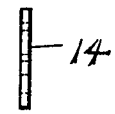
Figure 6 is an edge view looking towards the left hand in the preceding figure.

Appropriately pivoted on pintles 13 at opposed points on the casing 10 are a series of overlapping leaves 14 the outermost one $14^1$ of which is formed with a back 15 and a front end 16 so that when parts are collapsed as shown in Figures 1 and 2, a neat and compact closure for the leaves 14 is ensured, as well as an effective means being provided for preventing the drawn portion of the box of safety matches falling out. I may also inwardly flange the opposed end of the casing 10 as shown at 17 in Figure 4 so that should the box of safety matches be a loose fit in the casing 10 it cannot slip or fall out when once inserted as will be obvious to those skilled in the art to which my invention appertains.

In order to provide an effective means for limiting the movement of leaves 14, $14^1$ I preferably form arcuate slots or grooves 18 therein with which co-operate pins or projections 19, said means providing an easy manner for maintaining the parts in proper operative connection, as well as greatly facilitating the manufacture of the device from metal stampings.

Figure 7:
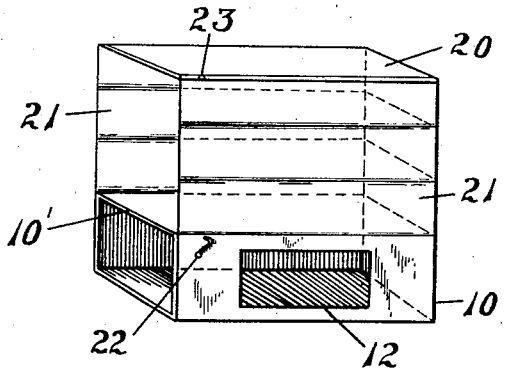
Figure 7 is a perspective view of a slightly modified form of the invention, with the windshield shown in opened out position.
Figure 8:
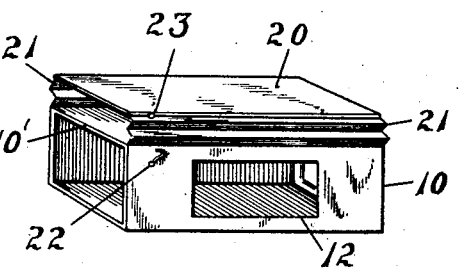
Figure 8 is a similar perspective view but showing the windshield in practically collapsed position.

Referring to the modified form of the invention shown in Figures 7 and 8 I make the windshield from a metal plate or the like 20 conforming in size to one of the walls 10¹ of the casing 10 and connect same in collapsible parallel relation thereto by flexible bellows fashion members 21, and provide a hook 22, and pin 23 as latching means for holding same down when closed or out of use, as will be clear from an inspection of the above referred to two figures.

In use a box of matches having been placed in the casing 10, when it is desired to strike a light, the user withdraws a match from the drawer and rubs or strikes same on the abrading material exposed through the slot, and in the event said light is being obtained in windy or stormy weather the struck match is quickly inserted into the opened out windshield whereupon the wall 10¹ and extended leaves will form an efficient protection from the wind or the like tending to cause its extinction, and a cigar, cigarette or pipe may be conveniently lighted by holding the same in or to the exposed or open end of the windshield.

From the foregoing it will thus be seen that by my invention I have provided a compact, neat and effective device for the purpose specified, and I wish it clearly understood that I do not limit myself to the precise details of shape and pattern described and shown, but consider myself at liberty to make such changes therein as may be reasonably construed as falling within the scope of the appended claim.

Having described my invention what I claim as new and desire to secure by Letters Patent is:—

A combined holder and windshield for a box of safety matches including a rectangular casing having an inwardly flanged end, opposed leaf members pivoted adjacent the flanged end and the outermost leaf members being connected by a back wall, pin and slot connections for limiting the outward and inward movement of said leaf members, and a turned over end on the back wall for closing the match-box in the holder when the device is not in use.

In testimony whereof I affix my signature.

FRANCIS W. MURPHY.